United States Patent
Shiraishi (10) Patent No.: US 12,481,163 B2
(45) Date of Patent: Nov. 25, 2025

(54) DISPLAY CONTROL DEVICE, DISPLAY DEVICE, AND DISPLAY CONTROL METHOD

(71) Applicant: Nippon Seiki Co., Ltd., Niigata (JP)

(72) Inventor: Naoyuki Shiraishi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 18/823,875

(22) Filed: Sep. 4, 2024

(65) Prior Publication Data

US 2025/0102818 A1  Mar. 27, 2025

(30) Foreign Application Priority Data

Sep. 21, 2023  (JP) ................. 2023-156344

(51) Int. Cl.
| | |
|---|---|
| G02B 27/01 | (2006.01) |
| B60K 35/233 | (2024.01) |
| G02B 27/64 | (2006.01) |

(52) U.S. Cl.
CPC ........ *G02B 27/0179* (2013.01); *B60K 35/233* (2024.01); *G02B 27/0149* (2013.01); *G02B 27/646* (2013.01); *B60K 2360/177* (2024.01); *G02B 2027/0159* (2013.01); *G02B 2027/0183* (2013.01)

(58) Field of Classification Search
CPC .................................................. B60K 35/00
See application file for complete search history.

(56) References Cited

U.S. PATENT DOCUMENTS

| | | | |
|---|---|---|---|
| 2003/0236607 A1* | 12/2003 | Tanaka .................. | G01C 22/00 701/79 |
| 2021/0109358 A1* | 4/2021 | Matsui .................. | B60K 35/90 |
| 2022/0343656 A1* | 10/2022 | Rachman ............... | G06V 20/56 |

FOREIGN PATENT DOCUMENTS

| | | |
|---|---|---|
| JP | 2003-065767 A | 3/2003 |
| WO | 2020/208883 A1 | 10/2020 |

* cited by examiner

*Primary Examiner* — Nan-Ying Yang
(74) *Attorney, Agent, or Firm* — Rimon P.C.

(57) ABSTRACT

A display control device includes: a vehicle vibration information acquisition portion; a vehicle state determination portion; a bias error correction value acquisition portion acquiring, during a stopped period of the vehicle, a bias error correction value correcting a bias error; a bias error correction portion; a vehicle posture variation amount detection portion; and a display correction portion changing one of a position and a size of an image. The bias error correction portion performs one of: first correction processing which gradually changes a previous bias error correction value with passage of time, and shifts the previous bias error correction value to an updated bias error correction value through a period of the change; and second correction processing which does not shift the previous bias error correction value to the updated bias error correction value in the stopped period but performs the shifting operation in a traveling period.

9 Claims, 8 Drawing Sheets

DISPLAY CONTROL DEVICE, DISPLAY DEVICE, AND DISPLAY CONTROL METHOD

CROSS-REFERENCE TO RELATED APPLICATIONS

This application claims benefit of foreign priority to Japanese Patent Application No. 2023-156344 filed on Sep. 21, 2023, and the entire contents of each of which are hereby incorporated by reference.

TECHNICAL FIELD

The present invention relates to, for example, a display control device, a display device, a display control method.

BACKGROUND ART

For example, Patent Document 1 describes a configuration in which a display position of an image is corrected on the basis of a change in the posture of a vehicle. According to Patent Document 1, angular velocities detected by a gyroscope sensor are integrated to calculate a posture variation amount of the vehicle, and the display position of the image is corrected such that, even when a large posture variation occurs, a characteristic portion of the image is positioned within a display region.

Further, sensors such as a gyroscope sensor mounted on a vehicle may sometimes issue a non-zero output value even in a state in which the vehicle is stopped and a sensor input (in other words, vibration caused by pitching or rolling of the vehicle) is substantially zero. This is referred to as a bias error. Bias errors of the sensors can contribute to an error in measuring variations in the posture of the vehicle. Correction of the bias error is described in, for example, Patent Document 2.

PRIOR ART DOCUMENT

Patent Document

Patent Document 1: WO2020/208883
Patent Document 2: JP2003-065767 A

SUMMARY OF INVENTION

Technical Problem

From the studies conducted by the inventor of the present invention, the following problems have been identified.
 (1) During traveling of a vehicle, a value of a bias error varies according to a temperature environment, and the type and the degree of vibration of the vehicle. Therefore, for example, even if the bias error is corrected once, if the same bias error correction value is continuously used, it is not possible to adapt to the above-mentioned variation in the bias error.
 (2) When bias error correction is performed during traveling of a vehicle (including not only a period during which the vehicle is actually traveling but also a period during which the vehicle is stopped), the display position of an image changes due to the bias error correction, and the change in the display position may cause a sense of incongruity to an occupant (a driver or a passenger) of the vehicle in some cases.
 (3) In particular, if a change in the display position of an image due to the bias error correction occurs during a period in which the vehicle is stopped (for example, in a case where a state of displaying an image with the image being superimposed on a target object is maintained even when the vehicle is being stopped, if the position of the superimposed image is changed), the change is likely to catch the occupant's attention, and a sense of incongruity is likely to be caused.

In other words, when the vehicle is being stopped, the occupant does not need to fix his/her eyes on, for example, the front or the like for safe driving, and is looking at the front or the like with a leeway. Further, since the vehicle is in a state with extremely small vibration when the vehicle is being stopped, the occupant tends to visually recognize a sudden change in the image position. Therefore, the likelihood of the occupant feeling a sense of incongruity is increased.

Such problems have been identified by the studies conducted by the inventor of the present invention. The above Patent Documents 1 and 2 do not describe such problems, and countermeasures against the problems are neither referred to therein.

An object of the present invention is to correct a bias error included in vibration information of a vehicle as appropriate without causing a sense of incongruity to the occupant of the vehicle.

Other objects of the present invention will be apparent to those skilled in the art by referring to the aspects and the best mode of embodiment exemplified below, and the accompanying drawings.

Solution to Problem

In order to facilitate understanding of the outline of the present invention, aspects according to the present invention will be exemplified.

In a first aspect, a display control device pertains to a display control device which controls image display of a display device that is mounted on a vehicle, and causes an occupant who is on board the vehicle to visually recognize an image, and the display control device includes: a vehicle vibration information acquisition portion which acquires vibration information of the vehicle; a vehicle state determination portion which determines whether the vehicle is traveling or being stopped; a bias error correction value acquisition portion which acquires, during a stopped period of the vehicle, a bias error correction value for correcting a bias error included in the acquired vibration information; a bias error correction portion which corrects the vibration information on the basis of the acquired bias error correction value; a vehicle posture variation amount detection portion which detects a variation amount of a posture of the vehicle on the basis of the corrected vibration information; and a display correction portion which changes at least one of a position and a size of the image such that the image corresponds to the detected variation amount of the posture of the vehicle. The bias error correction portion performs, when a latest bias error correction value acquired by the bias error correction value acquisition portion is assumed as an updated bias error correction value, and the bias error correction value before the update is performed is assumed as a previous bias error correction value, at least one of: first correction processing which gradually changes the previous bias error correction value with passage of time, and shifts the previous bias error correction value to the updated bias error correction value through a period of the change; and second correction processing which does not perform a shifting operation of shifting the previous bias error correction value to the updated bias error correction value in a stopped period of the vehicle but performs the shifting operation in a traveling period of the vehicle.

In the first aspect, first, during the stopped period of the vehicle, the bias error correction value acquisition portion acquires (in other words, updates) the bias error correction value. The vehicle repeats traveling and stopping when, for example, heading for a destination. Here, for example, at each stop of the vehicle or during a vehicle stopped period which matches with an update timing (that is set to, for example, a predetermined cycle in advance) of the bias error correction value within a plurality of vehicle stopped periods, the bias error correction value is updated as needed. A bias error of a gyroscope sensor or the like changes in accordance with a temperature environment or the like when the vehicle is traveling. However, according to the present aspect, since the bias error correction value is updated as needed by using the vehicle stopped period, it is possible to adapt to a temporal change in the bias error.

Next, on the basis of the updated bias error correction value, a bias error included in the vibration information (basically, an output value of the sensor, and specifically, an angular velocity or the like associated with pitching or rolling) is corrected during traveling of the vehicle (which includes an actual traveling state and a stopped state of the vehicle as a broad concept).

However, if correction of the bias error is unconditionally performed, the display position of an image varies every time the bias error is corrected. Thus, the variation may catch the passenger's attention and may cause the passenger to have a sense of incongruity.

Therefore, in the present aspect, as the countermeasure against the above, at least one of the first correction processing and the second correction processing is performed, and a predetermined condition is imposed on the correction of the bias error.

The first correction processing is the correction processing in which, when the acquired latest bias error correction value is referred to as an "updated bias error correction value" and the bias error correction value before the update is performed is referred to as a "previous bias error correction value", the "previous bias error correction value" is not changed steeply when the "previous bias error correction value" is changed into the "updated bias error correction value", but the "previous bias error correction value" is gradually changed with passage of time, and is shifted to the "updated bias error correction value" through a period of the change.

According to the first correction processing, since the bias error correction value is gradually changed with the passage of time, a movement of the position of the image which occurs in response to this change also becomes gradual, and no steep (step-like) movement is to be made. Therefore, the movement is less likely to catch the attention of the occupant in the vehicle, and it is possible to prevent the occupant from having a sense of incongruity.

Further, the second correction processing imposes a condition on the correction timing of the bias error, and is the correction processing in which the shifting operation of shifting the bias error correction value is not performed in the stopped period of the vehicle, but is performed in the traveling period of the vehicle.

In the second correction processing, the processing which gradually changes the correction value of the bias error with passage of time is not performed as in the first correction processing. However, since the correction processing of correcting the bias error is performed in the traveling period by avoiding the stopped period in which a change in the image position is likely to catch the attention of an occupant, it is possible to prevent the occupant from having a sense of incongruity.

In the present aspect, three types of embodiments may be assumed, i.e., only the first correction processing is performed, the first correction processing and the second correction processing are used in combination, or only the second correction processing is performed. In any of the above embodiments, a change in the image position due to a change in the correction value of the bias error is less likely to catch the attention of the occupant, and the advantage of being able to suppress the occurrence of a sense of incongruity is obtained.

In a second aspect depending on the first aspect, the bias error correction value acquisition portion may calculate a moving average of output values of a sensor, which detects the vibration information of the vehicle, each time an update timing of the bias error correction value arrives during the stopped period of the vehicle, and determine the bias error correction value on the basis of a moving average value that has been calculated.

In the second aspect, during the stopped period of the vehicle, the moving average of the output values of the sensor is calculated each time the update timing of the bias error correction value arrives, and the bias error correction value is determined (updated) on the basis of the moving average value.

In a period in which the vehicle is stopped (including a period in which the vehicle can be assumed as being substantially stopped), it is considered that an input of the sensor (in other words, vibration caused by pitching or rolling of the vehicle) is substantially zero (in other words, a state close to zero). In this case, when a non-zero output value is issued from the sensor, the output value indicates an error between the input and the output of the sensor. However, the error varies with passage of time.

In consideration of this point, in the present aspect, a moving average of the output values (for example, angular velocity values) of the sensor is obtained. The "moving average" is an average value of time-series data in a predetermined section. In the case of setting a plurality of predetermined sections, an average of pieces of data obtained in each section may be calculated, and this average may be applied as the moving average.

Obtaining the moving average is easy and high-speed calculation is possible. Also, a load on a processor or the like is small.

The moving average value of the output values (for example, the angular velocity values) of the sensor may also be referred to as a bias error of the sensor. When there is a difference between the previous bias error and the latest bias error (updated bias error), the latest bias error is used to correct the output value (for example, the angular velocity value) of the sensor.

In this way, for example, the accuracy of measuring a posture variation amount of the vehicle is improved.

In a third aspect depending on the first or second aspect, when the bias error correction portion performs the first correction processing, the first correction processing may be performed in a period including a vehicle stopped period in which the bias error correction value is acquired by the bias error correction value acquisition portion.

In the third aspect, when the bias error correction value is acquired (updated) in the stopped period of the vehicle, the first correction processing is performed in the period including the vehicle stopped period. As described above, when the bias error correction is performed in the vehicle stopped period, a movement of the position of an image due to the bias error correction is likely to catch the attention of the occupant of the vehicle.

However, by performing the first correction processing (i.e., the correction processing of gradually changing the bias error correction value with passage of time), it is possible to prevent a movement of the position of the image from catching the attention of the occupant. By utilizing this advantage, in the present aspect, after the bias error correction value has been acquired (updated), the bias error correction is performed in a period including the same vehicle stopped period. Therefore, the bias error correction is performed in a period including the vehicle stopped period.

Here, the expression "period including the vehicle stopped period" indicates that "there may be a case where the first correction processing is started within the vehicle stopped period, but the first correction processing is not completed at the time of a start of the traveling, and in that case, the first correction processing may be continued until a period to complete the first correction processing even after the traveling has been started".

Consequently, when the vehicle is shifted from a stopped state to a traveling state, an image is enabled to be displayed at an accurate position without being affected by the bias error from the beginning of that traveling state. Thus, the occupant is able to visually recognize the image which does not produce a sense of incongruity.

In a fourth aspect depending on the first or second aspect, the bias error correction portion may use the first correction processing and the second correction processing in combination, and by the combined use of the first correction processing and the second correction processing, the first correction processing may not be performed in the stopped period of the vehicle but may be performed in the traveling period of the vehicle.

In the fourth aspect, the first correction processing and the second correction processing are used in combination. In other words, the first correction processing which gradually changes the bias error correction value with passage of time is not performed during a stopped period of the vehicle but is performed during a traveling period of the vehicle. As the first correction processing is performed only when the vehicle is traveling by avoiding the stopped period in which the occupant relatively has a leeway (and the vibration of the vehicle is also extremely small), the possibility that the occupant may perceive a change in the position of an image due to the correction of the bias error is further lowered. Therefore, it is possible to further suppress the possibility of causing a sense of incongruity to the occupant.

In a fifth aspect depending on the first or second aspect, when the bias error correction value acquisition portion performs the second correction processing, the bias error correction value acquisition portion may wait for the vehicle to shift to a traveling state while acquiring the bias error correction value each time an update timing of the bias error correction value arrives during the stopped period of the vehicle, and shift, when the vehicle is in the traveling state, the previous bias error correction value to the latest updated bias error correction value.

In the fifth aspect, in performing the second correction processing (i.e., the correction processing of performing the bias error correction only during the traveling period of the vehicle), the operation of waiting for the vehicle to shift to the traveling state while acquiring, during the stopped period of the vehicle, the bias error correction value each time the update timing of the bias error correction value arrives is performed. Then, when the vehicle is in the traveling state, the previous bias error correction value is shifted to the latest updated bias error correction value, thereby performing the bias error correction.

According to the present aspect, an accurate bias error correction can be performed on the basis of the latest bias error correction value. Moreover, as the second correction processing is performed only when the vehicle is traveling by avoiding a stopped period in which the occupant relatively has a leeway (and the vibration of the vehicle is also extremely small), the possibility that the occupant may perceive a change in the position of an image due to the correction of the bias error is lowered. Therefore, it is possible to suppress the possibility of causing a sense of incongruity to the occupant.

In a sixth aspect depending on the first to fifth aspects, the vibration information of the vehicle may be an angular velocity or acceleration information in at least one of pitching and rolling of the vehicle.

According to the sixth aspect, it is possible to accurately correct the angular velocity or acceleration, which is the vibration information, by using the latest bias error correction value, and thus, a posture variation in pitching or rolling can be detected (measured) with high accuracy.

In a seventh aspect, a display device includes a display control device according to any one of the first to sixth aspects, and a display portion in which display of an image is controlled by the display control device.

According to the seventh aspect, it is possible to realize a high-performance display device capable of correcting a bias error included in the vibration information of the vehicle as appropriate without causing a sense of incongruity to the occupant of the vehicle.

In an eighth aspect depending on the seventh aspect, the display device may further include an optical system which projects display light of an image displayed on the display portion onto a projected member that is provided on the vehicle, and the display device may be a head-up display device having the function of causing the occupant to visually recognize a virtual image.

According to the eighth aspect, it is possible to realize a high-performance head-up display (HUD) device capable of correcting a bias error included in the vibration information of the vehicle as appropriate without causing a sense of incongruity to the occupant of the vehicle.

In a ninth aspect, a display control method pertains to a display control method in a display device which is mounted on a vehicle, and the display control method includes: a step of acquiring, during a stopped period of the vehicle, a bias error correction value for correcting a bias error included in vibration information of the vehicle; a step of correcting the vibration information on the basis of the bias error correction value; a step of detecting a variation amount of a posture of the vehicle on the basis of the corrected vibration information; and a step of changing at least one of a position and a size of an image such that the image corresponds to the detected variation amount of the posture of the vehicle. When a latest bias error correction value acquired by the step of acquiring the bias error correction value is assumed as an updated bias error correction value, and the bias error correction value before the update is performed is assumed as a previous bias error correction value, the step of correcting the vibration information performs at least one of: first correction processing which gradually changes the previous bias error correction value with passage of time, and shifts the previous bias error correction value to the updated bias error correction value through a period of the change; and second correction processing which does not perform a shifting operation of shifting the previous bias error correction value to the updated bias error correction value in a stopped period of the vehicle but performs the shifting operation in a traveling period of the vehicle.

According to the ninth aspect, it is possible to realize a display control method capable of correcting a bias error included in the vibration information of the vehicle as appropriate without causing a sense of incongruity to the occupant of the vehicle.

Those skilled in the art will readily appreciate that the aspects according to the present invention that have been exemplified may be further modified without departing from the spirit of the present invention.

DESCRIPTION OF EMBODIMENTS

The best mode of embodiment described below is used to facilitate understanding of the present invention. Therefore, those skilled in the art should note that the present invention is not unreasonably limited by the embodiments described below.

In the following description, bias error correction processing to be performed in a case where the position or the like of an image is corrected in response to pitching or rolling of a vehicle will be described. However, the above is merely an example and is not limited to this example.

The pitching of a vehicle refers to a state in which the vehicle rotates back and forth, that is, the so-called pitch occurs, about a lateral axis of the vehicle (i.e., an axis passing through the center (for example, the center of gravity) of the vehicle and extending in a left-right direction of the vehicle). In this state, the posture of the vehicle is a forward-inclined posture or a backward-inclined posture.

Further, the rolling of a vehicle refers to a state in which the vehicle rotates to the left and right, that is, the so-called roll occurs, about a longitudinal axis thereof (i.e., an axis passing through the center (for example, the center of gravity) of the vehicle and extending in a front-back direction of the vehicle). In this state, the posture of the vehicle is a leftward-inclined posture or a rightward-inclined posture.

Figure 1:
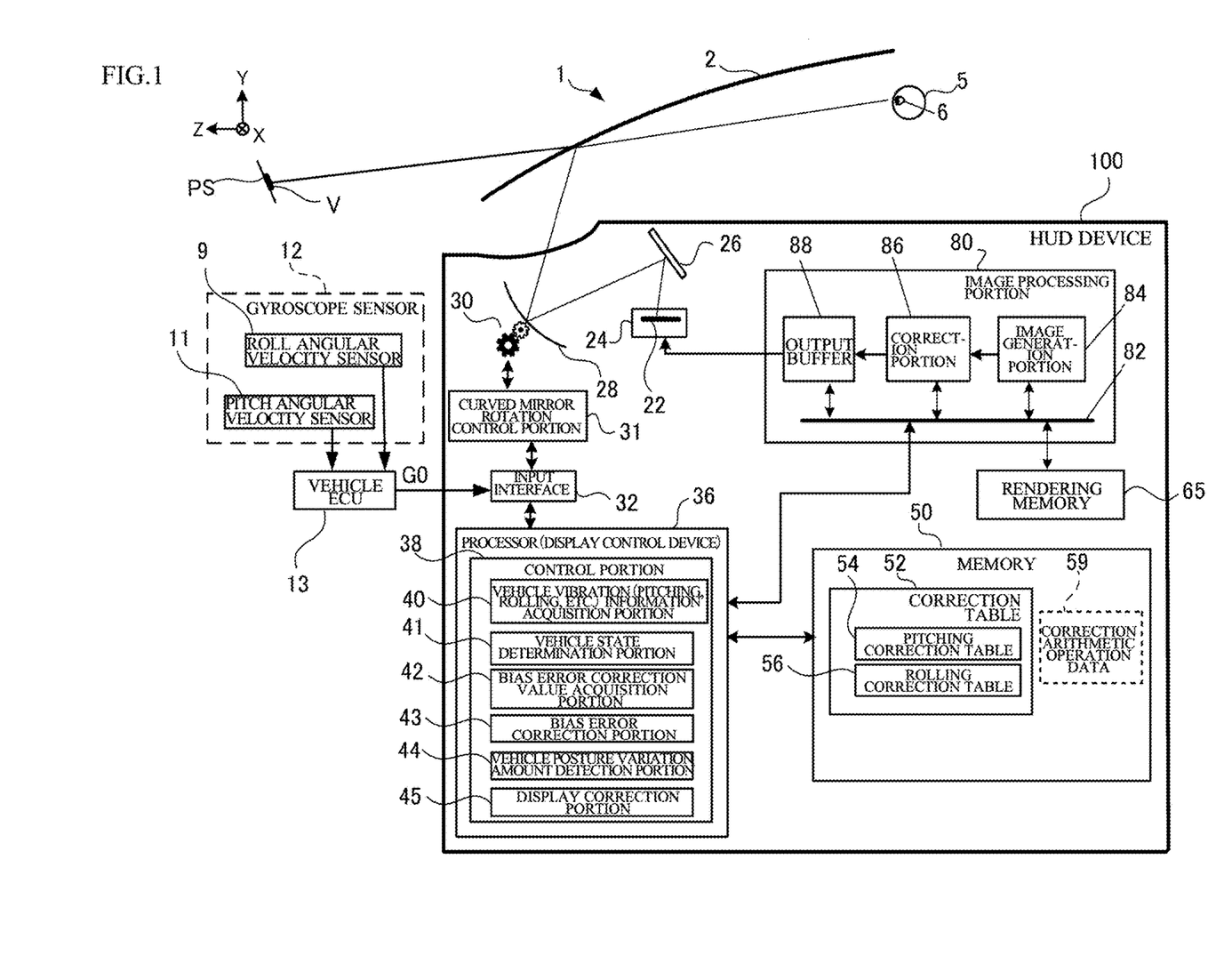
FIG. 1 is a diagram illustrating a configuration example of a display control device, a configuration example of a display device (a head-up display (HUD device)) using the display control device, and a configuration example of a display system.

Further, in FIG. 1, X direction indicates the left-right direction of the vehicle, Y direction indicates a height direction of the vehicle, and Z direction indicates the front-back direction (the front or the back) of the vehicle.

First Embodiment

Reference is made to FIG. 1. FIG. 1 is a diagram illustrating a configuration example of a display control device, a configuration example of a display device (a head-up display (HUD device)) using the display control device, and a configuration example of a display system.

A HUD device 100 projects display light (performs projection) of an image onto a windshield 2 of a vehicle 1, and causes reflected light, which is a part of the display light, to be incident on the eyes (viewpoint) 6 of an occupant (a driver or a passenger) 5 of the vehicle 1, thereby displaying an image (a virtual image) V on a virtual image display surface PS that is virtually set at the front (i.e., in the Z direction) of the vehicle 1.

The HUD device 100 includes a processor (a display control device) 36, an image processing portion 80, a light source portion 24 (including a display portion 22 having a flat panel display, etc.), a plane mirror 26 and a curved mirror (concave mirror, etc.) 28 as an optical system, a rotation mechanism (including an actuator) 30 which rotationally drives the curved mirror (concave mirror, etc.) 28, a curved mirror rotation control portion 31 which controls the rotation of the curved mirror 28, an input interface (input IF) 32, a memory (a storage device or a storage portion) 50, and a rendering memory 65.

Further, the vehicle 1 is provided with a gyroscope sensor 12 (including a roll angular velocity sensor 9 and a pitch angular velocity sensor 11) and a vehicle electronic control unit (ECU) 13. In the following description, the "gyroscope sensor 12" may be simply referred to as "sensor 12".

The processor (the display control device) 36 is a display control device which controls image display of a display device (the HUD device) 100 that is mounted on the vehicle 1, and causes the occupant (a viewer) 5 who is on board the vehicle 1 to visually recognize the image (the virtual image) V.

The processor (the display control device) 36 includes: a vehicle vibration (pitching, rolling, etc.) information acquisition portion 40 which acquires vibration information (angular velocity information in this case) of the vehicle 1; a vehicle state determination portion 41 which determines whether the vehicle 1 is traveling or being stopped; a bias error correction value acquisition portion 42 which acquires, during a stopped period of the vehicle 1, a bias error correction value for correcting a bias error included in the acquired vibration information (the angular velocity information); a bias error correction portion 43 which corrects the vibration information (the angular velocity information) on the basis of the acquired bias error correction value; a vehicle posture variation amount detection portion 44 which detects a variation amount of the posture of the vehicle 1 on the basis of the corrected vibration information; and a display correction portion 45 which changes at least one of a position and a size of the image (the virtual image) V such that the image (the virtual image) V corresponds to the detected variation amount of the posture of the vehicle 1.

Here, when the latest bias error correction value acquired by the bias error correction value acquisition portion 42 is assumed as an "updated bias error correction value" and the bias error correction value before the update is performed is assumed as a "previous bias error correction value", the bias error correction portion 43 performs at least one of: "first correction processing" which gradually changes the "previous bias error correction value" with passage of time, and shifts the previous bias error correction value to the "updated bias error correction value" through a period of the change; and "second correction processing" which does not perform a shifting operation of shifting the previous bias error correction value to the updated bias error correction value in a stopped period of the vehicle but performs the shifting operation in a traveling period of the vehicle.

The "first correction processing" is correction processing of gradually changing the bias error correction value on a time axis, and the "second correction processing" is correction processing by a kind of timing control in which the bias error correction is not performed in a stopped state of the vehicle but is performed only in a traveling state. Details of the above types of processing will be described later.

The memory 50 is provided with a correction table 52 (including a pitching correction table 54 and a rolling correction table 56). The display correction portion 45 of the processor (the display control device) 36 can refer to the correction table 52 as appropriate when performing display correction.

Also, when the display correction portion 45 performs a predetermined correction arithmetic operation in correcting a display, the display correction portion 45 can use correction arithmetic operation data 59 provided in the memory 50 as appropriate.

The image processing portion 80 includes a bus 82, an image generation portion 84, a correction portion (an image correction portion) 86, and an output buffer 88. The image generation portion 84 can use image data stored in the rendering memory 65 as appropriate in generating an image.

The correction portion (the image correction portion) 86 can change (correct) at least one of a display position of an image and the size of the image on the display portion (flat panel display, etc.) 22 of the light source portion 24.

The output buffer 88 supplies image data output from the correction portion (the image correction portion) 86 to the display portion 22 of the light source portion 24.

When the display correction portion 45 of the processor (the display control device) 36 is to change the display position of an image in response to an update of the bias error correction value, the display correction portion 45 supplies display position information on an image after the change to at least one of the correction portion (the image correction portion) 86 of the image processing portion 80 and the curved mirror rotation control portion 31.

As the display position of an image or the size of the image on the display portion 22 is changed by the correction portion (the image correction portion) 86, the position or the size of the image (the virtual image) V on the virtual image display surface PS is changed.

In addition, as the curved mirror (concave mirror, etc.) 28 is rotationally driven by the curved mirror rotation control portion 31, the position of the virtual image display surface PS (i.e., the position in the height direction (the Y direction) of the vehicle) is adjusted. Also by this adjustment, the position of the image (the virtual image) V can be changed.

Next, the above-mentioned "first correction processing" will be described. The specifics of the "first correction processing" will be indicated in FIGS. 3 and 4. However, before describing these figures, a problem studied and identified by the inventor of the present invention before the present invention was conceived will be described with reference to FIG. 2 (this is a premise of the present invention and is not a known technique).

Figure 2:
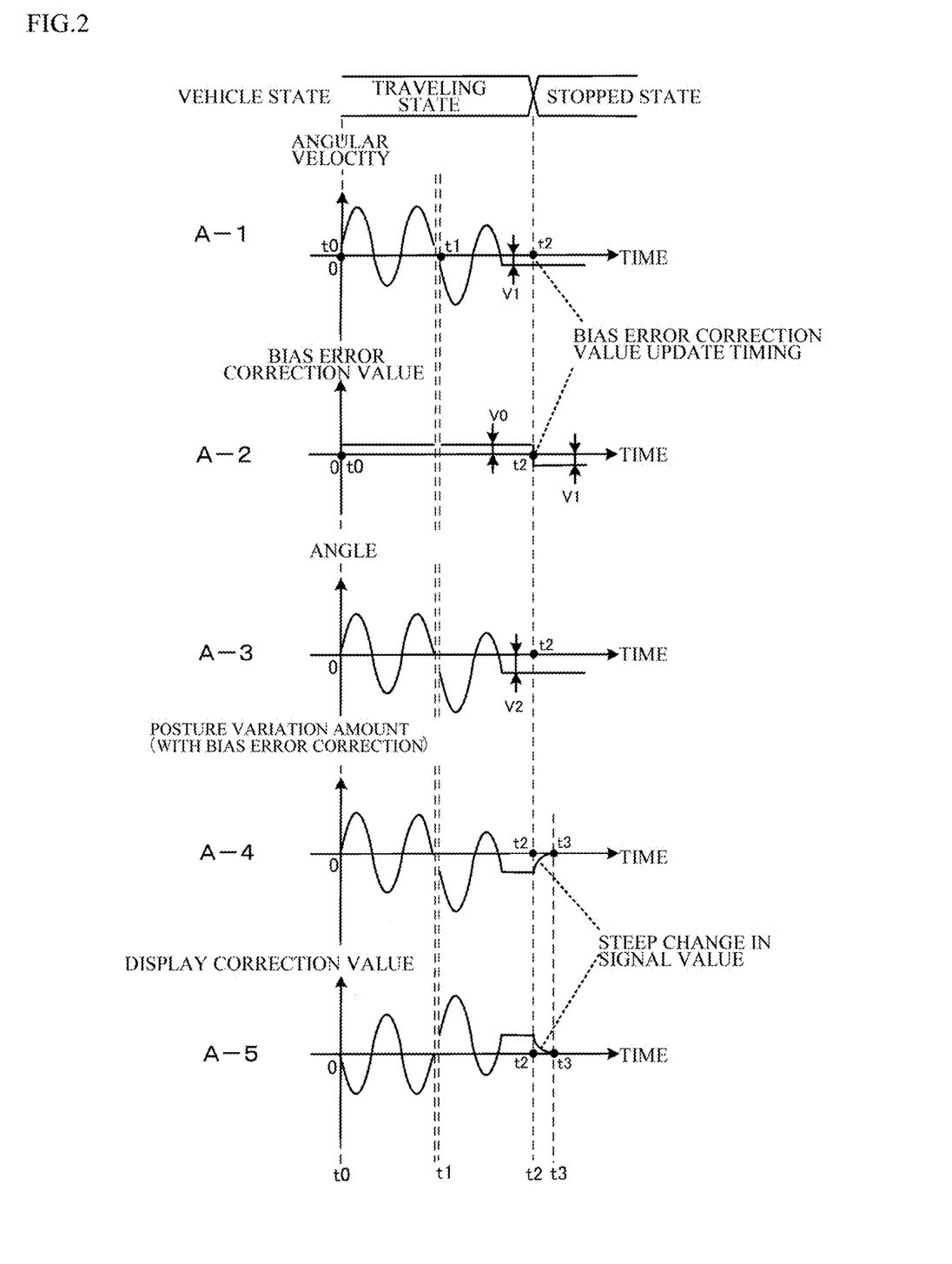
FIG. 2 is a diagram showing a problem associated with bias error correction, which has been studied by the inventor of the present invention before the present invention was conceived.

FIG. 2 is a diagram showing a problem associated with bias error correction, which has been studied by the inventor of the present invention before the present invention was conceived.

In A-1 to A-5 of FIG. 2, while the horizontal axis indicates a time axis, the time axis also serves as a reference axis on which a signal value is zero (i.e., an axis on which a signal value is zero) with respect to various signals indicated on the vertical axis.

In FIG. 2, the vehicle 1 is in a traveling state from time t0 to time t2, and the vehicle 1 shifts to a stopped state at time t3.

A-1 of FIG. 2 illustrates an example of a waveform (a vibration waveform) of the vibration information (specifically, a pitch angular velocity or a roll angular velocity) of the vehicle 1 that is output from the gyroscope sensor (which may hereinafter be simply referred to as a sensor) 12.

Here, at time t1, a change occurs in the amplitude of the vibration waveform. This is caused by a fluctuation of the value of the bias error superimposed on the vibration waveform.

Slightly before time t2, the vehicle 1 substantially stops. Therefore, a vibration waveform is no more output from the sensor. Here, if there is no bias error, an output value (an angular velocity value) of the sensor should be zero. However, in A-1 of FIG. 2, a DC component of "V1" is output as the output value (the angular velocity value) of the sensor. This indicates the value of the latest bias error. If the latest "bias error" is acquired, the value of that bias error can be directly used as a "bias error correction value". For example, if a bias error "V1" is superimposed on the vibration waveform indicating the angular velocity, bias error correction for the angular velocity is realized by subtracting the bias error "V1" from the vibration waveform.

In other words, if the latest "bias error" is acquired, a "bias error correction value" is uniquely determined on the basis of that "bias error".

While the above-mentioned "V1" is a "bias error", "V1" can also be rephrased as a "bias error correction value". In consideration of this point, in A-2 of FIG. 2, the vertical axis related to the vibration waveform is described as "bias error correction value". The same applies to FIGS. 4, 6, and 8.

At time t2 in A-1 of FIG. 2, an update timing of the bias error correction value arrives. Therefore, at time t2 mentioned above, the latest bias error V1 is acquired, and the bias error correction value V1 is uniquely determined.

As indicated by A-2 of FIG. 2, although the bias error correction value is "V0" from time to and up to time t2, the bias error correction value to be newly acquired at time t2 is "V1".

A-3 of FIG. 2 illustrates an example of a waveform of an angle obtained by integrating angular velocities (which is an angle before bias error correction is performed in this example). A bias error superimposed on the angle (a pitch angle or a roll angle) is "V2".

A-4 of FIG. 2 illustrates an example of a waveform indicating a posture variation amount of the vehicle (with bias error correction at time t2). The posture variation amount of the vehicle can be acquired by calculating, on the basis of angle information acquired in A-3 of FIG. 2, an amount of rotation about the "lateral axis" or the "longitudinal axis" of the vehicle (i.e., a deviation from a reference posture).

In A-4 of FIG. 2, a signal value indicating the posture variation amount changes considerably steeply, from time t2 to time t3, in accordance with an update of the bias error correction value.

In A-5 of FIG. 2, a waveform of a display correction value is of a reversed polarity to the waveform of the posture variation amount in A-4 of FIG. 2. Also in A-5 of FIG. 2, the display correction value changes considerably steeply from time t2 to time t3. In accordance with this change, a display position of the image is changed considerably steeply.

As can be seen, when bias error correction is performed during traveling of a vehicle, the display position of an image changes due to the bias error correction performed, and there may be a case where the change in the display position causes a sense of incongruity to the occupant (a driver or a passenger) of the vehicle.

In particular, if a change in the display position of an image due to the bias error correction occurs during a period in which the vehicle is stopped (for example, in a case where a state of displaying an image with the image being superimposed on a target object is maintained even when the vehicle is being stopped, if the position of the superimposed image is changed and the position is deviated from the target object), the change is likely to catch the occupant's attention, and a sense of incongruity is likely to be caused.

In other words, when the vehicle is being stopped, the occupant does not need to fix his/her eyes on, for example, the front or the like for safe driving, and is looking at the front or the like with a leeway. Further, since the vehicle is in a state with extremely small vibration when the vehicle is being stopped, the occupant tends to visually recognize (perceive) a sudden change in the image position. Therefore, the likelihood of the occupant feeling a sense of incongruity is increased.

Such a problem has been identified by the studies conducted by the inventor of the present invention before the present invention was conceived. Next, countermeasures against the problem will be described.

Figure 3:
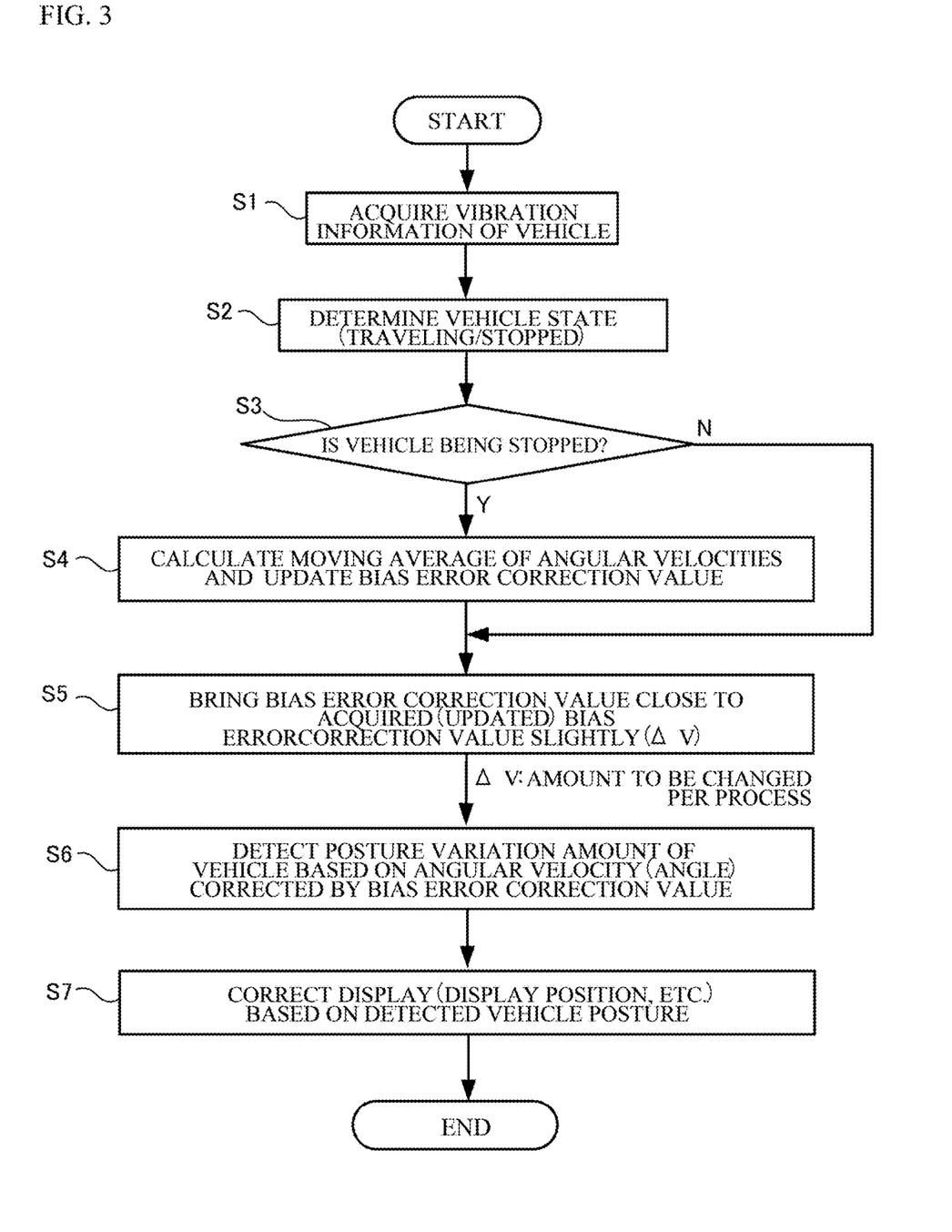
FIG. 3 is a flowchart illustrating a main operation procedure of a display control device according to a first embodiment.

Reference is made to FIG. 3. FIG. 3 is a flowchart illustrating a main operation procedure of the display control device according to the first embodiment.

In step S1, vibration information of the vehicle is acquired. In step S2, a vehicle state (traveling/stopped) is determined.

In step S3, when the vehicle is being stopped (in other words, if Y applies), the procedure proceeds to step S4, whereas, if N applies, the procedure proceeds to step S5.

In step S4, a moving average of the angular velocities is calculated, and the bias error correction value is updated.

Specifically, the bias error correction value acquisition portion 42 illustrated in FIG. 1 calculates the moving average of output values of the sensor 12, which detects the vibration information of the vehicle 1, each time an update timing of the bias error correction value arrives during a stopped period of the vehicle 1, and determines (acquires or updates) the bias error correction value on the basis of the calculated moving average value.

Since the bias error correction value is updated as needed by using the vehicle stopped period, it is possible to adapt to a temporal change in the bias error.

In a period in which the vehicle is stopped (including a period in which the vehicle can be assumed as being substantially stopped), it is considered that an input of the sensor 12 (in other words, vibration caused by pitching or rolling of the vehicle) is substantially zero (in other words, in a state close to zero).

In this case, when a non-zero output value is issued from the sensor 12, the output value indicates an error between the input and the output of the sensor. However, the error varies with passage of time.

In consideration of this point, in step S4, a moving average of the output values (for example, angular velocity values) of the sensor 12 is obtained. The "moving average" is an average value of time-series data in a predetermined section. In the case of setting a plurality of predetermined sections, an average of pieces of data obtained in each section may be calculated, and this average may be applied as the moving average. Obtaining the moving average is easy and high-speed calculation is possible. Also, a load on the processor or the like is small.

A moving average value of the output values (for example, the angular velocity values) of the sensor 12 may also be referred to as a bias error of the sensor 12. When there is a difference between the previous bias error and the latest bias error (updated bias error), the latest bias error is used to correct the output value (for example, the angular velocity value) of the sensor 12. In this way, for example, the accuracy of measuring the posture variation amount of the vehicle is improved.

In step S5, the bias error correction value is brought close to the acquired (updated) bias error correction value slightly ($\Delta V$). Here, $\Delta V$ is an amount to be changed per process (a minute amount of change). For example, a case where a bias error correction value is changed little by little at, for example, a frequency of 60 Hz (in other words, at a cycle of ($\frac{1}{60}$) seconds) in updating the bias error correction value is assumed. In this case, the timing at which the bias error correction value is changed by the minute amount of change $\Delta V$ arrives every ($\frac{1}{60}$) seconds. Each time this timing arrives, the bias error correction value changes by $\Delta V$.

In other words, a bias error included in the vibration information is corrected on the basis of the updated bias error correction value during traveling of the vehicle (which includes an actual traveling state and a stopped state of the vehicle as a broad concept). However, if correction of the bias error is unconditionally performed, the display position of an image varies every time the bias error is corrected. Thus, the variation may catch the passenger's attention and may cause the passenger to have a sense of incongruity.

Hence, in the example of FIG. 3, the "first correction processing" is performed. The "first correction processing" is the correction processing in which, when the acquired latest bias error correction value is referred to as an "updated bias error correction value" and the bias error correction value before the update is performed is referred to as a "previous bias error correction value", the "previous bias error correction value" is gradually changed with passage of time, and is shifted to the "updated bias error correction value" through a period of the change.

According to the first correction processing of step S5, since the correction value of the bias error is gradually changed with the passage of time, a movement of the position of the image which occurs in response to this change also becomes gradual, and no steep (step-like) movement is to be made. Therefore, the movement is less likely to catch the attention of the occupant in the vehicle, and it is possible to prevent the occupant from having a sense of incongruity.

In step S6, the posture variation amount of the vehicle is detected on the basis of the angular velocity (angle) corrected by the bias error correction value.

In step S7, the display (display position, etc.) is corrected on the basis of the detected vehicle posture.

As described in step S5, since the correction value of the bias error is gradually changed with the passage of time by the "first correction processing", a movement of the position of the image which occurs in response to this change also becomes gradual, and no steep (step-like) movement is to be made. Therefore, the movement is less likely to catch the attention of the occupant in the vehicle, and it is possible to prevent the occupant from having a sense of incongruity.

Further, in one preferred embodiment, when a bias error correction value is acquired (updated) in a stopped period of the vehicle 1, the first correction processing (i.e., the correction processing of gradually changing the bias error correction value with passage of time) is performed in a period including the vehicle stopped period. In other words, the bias error correction is performed in a period including the vehicle stopped period.

Here, the expression "period including the vehicle stopped period" indicates that "there may be a case where the first correction processing is started within the vehicle stopped period, but the first correction processing is not completed at the time of a start of the traveling, and in that case, the first correction processing may be continued until a period to complete the first correction processing even after the traveling has been started".

Consequently, when the vehicle 1 is shifted from the stopped state to the traveling state, an image is enabled to be displayed at an accurate position without being affected by the bias error from the beginning of that traveling state. Thus, the occupant is able to visually recognize the image which does not produce a sense of incongruity from the beginning of a start of the traveling.

Figure 4:
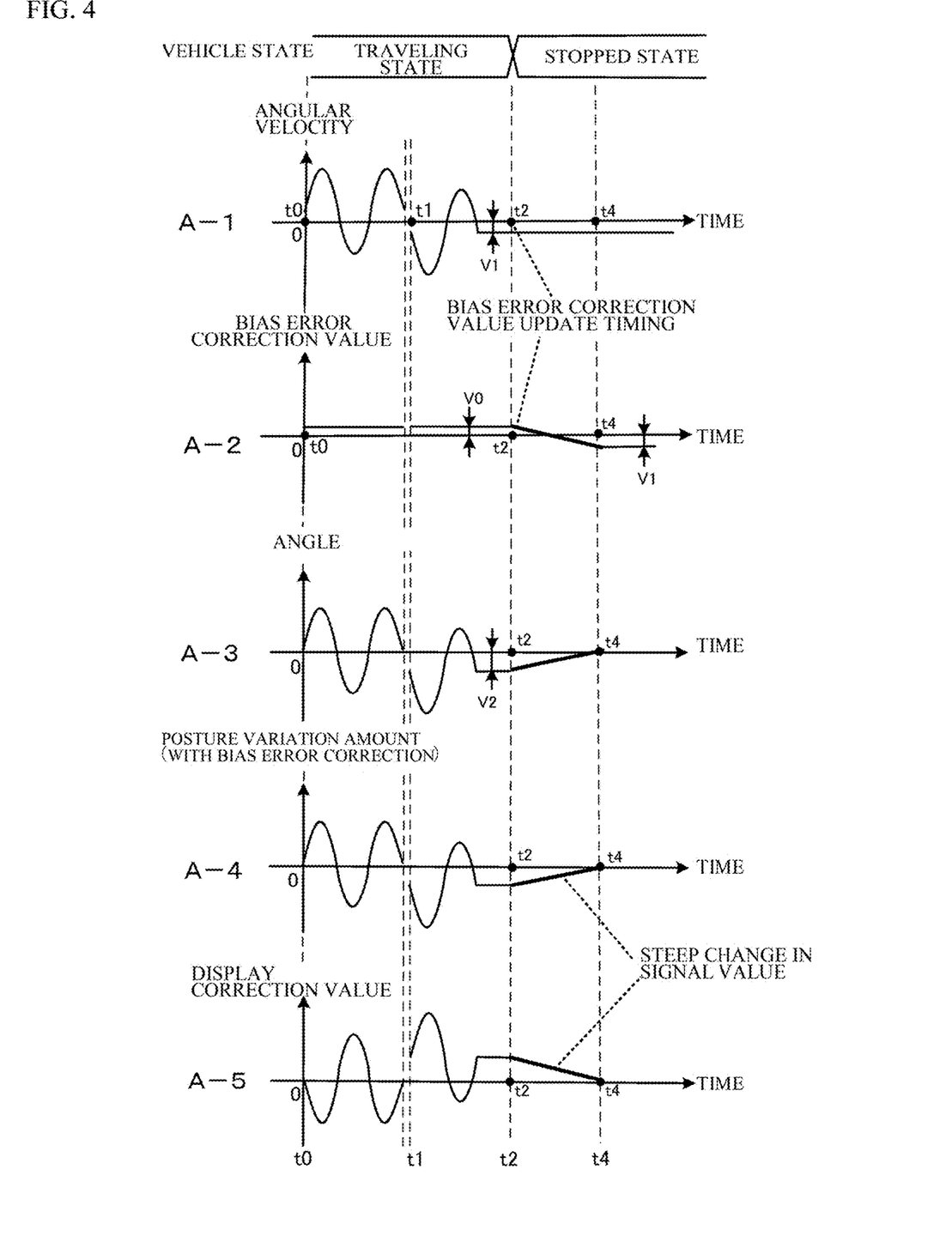
FIG. 4 is a waveform chart illustrating a main operation of the display control device according to the first embodiment.

Next, reference is made to FIG. 4. FIG. 4 is a waveform chart illustrating a main operation of the display control device according to the first embodiment.

A-1 of FIG. 4 is substantially the same as A-1 of FIG. 2 described above.

In A-2 of FIG. 4, a bias error correction value is updated at time t2. A previous bias error correction value is V0, and the updated bias error correction value is V1. Here, a shift (switching) from the previous bias error correction value V0 to the updated bias error correction value V1 is gradually performed through a predetermined period from time t2 to time t4. In the example of A-2 of FIG. 4, the bias error correction value is gradually changed with passage of time along a linear characteristic line having a predetermined gradient.

A-3 of FIG. 4 illustrates a change in the waveform of an angle (angle information) obtained by integrating the angular velocity information when the bias error correction is performed. Also in A-3 of FIG. 4, a bias error superimposed on the angle (angle information) gradually becomes close to zero from time t2 to time t4, and the bias error correction ends at time t4.

The waveform of a posture variation amount (with bias error correction) indicated in A-4 of FIG. 4 is the same as the waveform in A-3 of FIG. 4. From time t2 to time t4, a signal value indicating the posture variation amount gradually changes on the time axis in accordance with the change in the bias error correction value.

In A-5 of FIG. 4, the waveform of a display correction value is of a reversed polarity to the waveform of the posture variation amount in A-4 of FIG. 4. The display correction value gradually changes on the time axis from time t2 to time t4. Therefore, for example, even in a case where bias error correction is performed in a vehicle stopped period (a period including the vehicle stopped period) in which the latest bias error is acquired, a change in the display position of the image becomes gradual, and it is possible to prevent a sense of incongruity from being caused to an occupant (a driver or a passenger) of the vehicle.

Second Embodiment

Figure 5:
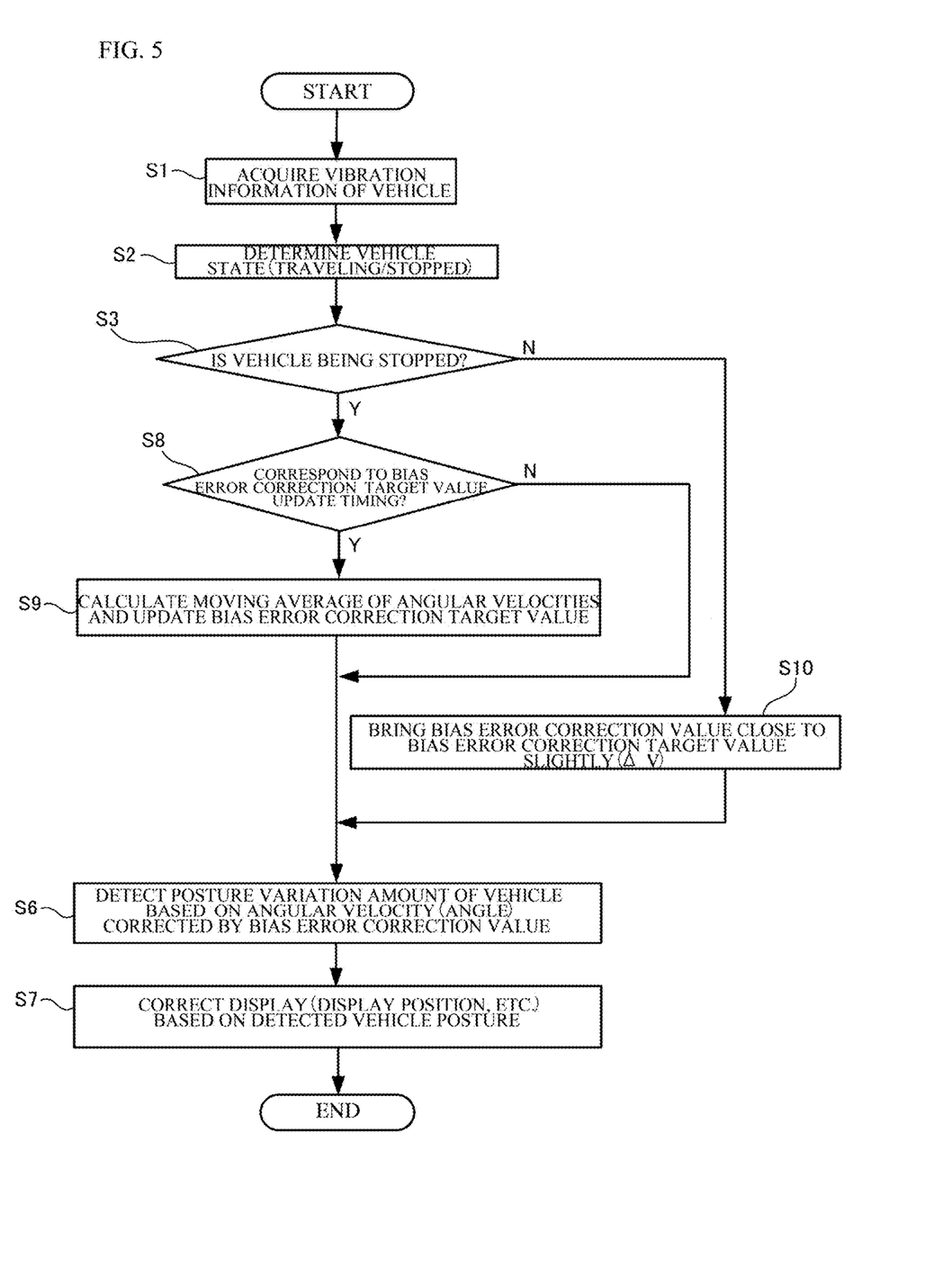
FIG. 5 is a flowchart illustrating a main operation procedure of a display control device according to a second embodiment.

Reference is made to FIG. 5. FIG. 5 is a flowchart illustrating a main operation procedure of a display control device according to a second embodiment. In FIG. 5, the same steps as those of FIG. 3 described above are denoted by the same reference numerals.

Steps S1 to S3, and steps S6 and S7 of FIG. 5 are the same as those of FIG. 3. Description of the steps that are the same as those of FIG. 3 will be omitted. In FIG. 5, steps S8 to S10 are added to the steps of FIG. 3.

In the present embodiment, first correction processing (i.e., correction processing of gradually changing a correction value of a bias error with passage of time) described in the first embodiment (FIGS. 3 and 4) is not performed in a stopped period of a vehicle, but is performed in a traveling period of the vehicle.

Here, in the present specification, correction processing in which a condition is imposed on a correction timing, more specifically, the correction processing in which "the operation of updating a bias error correction value is not performed in a stopped period of a vehicle, but is performed in a traveling period of the vehicle", is referred to as "second correction processing".

According to the second correction processing, the correction processing of correcting the bias error is performed in the traveling period by avoiding the stopped period in which a change in the image position is likely to catch the attention of an occupant. Therefore, it is possible to prevent the occupant from having a sense of incongruity.

In the present embodiment, the first correction processing (the correction processing of gradually changing the correction value of a bias error with passage of time) and the second correction processing (the correction processing in which a condition is imposed on the correction timing, more specifically, the correction processing which performs the operation of shifting the bias error correction value in a traveling period of the vehicle) are used in combination.

Specifically, during a vehicle stopped period, every time a bias error correction value update timing arrives, the bias error correction value is acquired (updated) by taking, for example, a moving average of angular velocities. However, correction of the bias error using the updated bias error correction value is not performed during the vehicle stopped period.

The bias error correction portion 43 illustrated in FIG. 1 performs a characteristic operation, which is performing an update of a bias error correction value during a vehicle stopped period; while maintaining (holding) the latest bias error correction value acquired as a result of the update, waiting for the vehicle to shift to a traveling period; and correcting, when the vehicle shifts to the traveling period, the bias error by using the latest bias error correction value that is maintained (held). The steps for performing the characteristic operation are steps S8 to S10 of FIG. 5.

In the following description, the term "bias error correction target value" will be used for convenience of description (for convenience of simplifying the description of the flowchart).

For example, for step S5 of FIG. 3 described above, it has been described that "bias error correction value is brought close to the acquired (updated) bias error correction value slightly (ΔV) (where ΔV is an amount to be changed per process (a minute amount of change)". In contrast, in FIG. 5, the above expression "acquired (updated) bias error correction value" is replaced by "bias error correction target value" for convenience of description.

When considered from another perspective, the "acquired (updated) bias error correction value" can also be regarded as a "target value" indicating an end point in a case where the bias error correction value is to be changed. Therefore, in consideration of this point, the "acquired (updated) bias error correction value" is rephrased as the "bias error correction target value" in the example of FIG. 5 (the same applies to the example of FIG. 7 which will be described later).

Steps S1 and S2 are the same as those of FIG. 3.

In step S3, when the vehicle is being stopped (in other words, if Y applies in step S3), the procedure proceeds to step S8, whereas, if N applies, the procedure proceeds to step S10.

In step S8, it is determined whether or not the timing corresponds to an update timing of the bias error correction target value. If Y applies, the procedure proceeds to step S9, and if N applies, the procedure proceeds to step S6.

In step S9, a moving average of angular velocities is calculated, and the bias error correction target value is updated.

However, while the bias error correction target value is updated at this point, no change is made to the bias error correction value, and the current value is maintained.

In other words, a change is made to the bias error correction value when the processing of bringing the bias error correction value close to the bias error correction target value as indicated in step S10 is performed. At the point of step S9, no change is made to the bias error correction value.

Further, a step corresponding to step 10 is not provided between step S9 and step S6.

Therefore, in a case where the procedure has proceeded to step S6 and step S7 via step S9 (i.e., the case where the vehicle is being stopped), no change is made to the bias error correction value as a consequence, and the status quo is maintained. In other words, in a case where the vehicle is being stopped, image correction is not performed, and thus, the display position of an image is not changed.

Meanwhile, in a case where N (i.e., the vehicle is traveling) applies in step S3, and the procedure has proceeded to step S10, the processing of bringing, by ΔV, the bias error correction value close to the bias error correction target value (i.e., the bias error correction target value acquired in step S9 when the vehicle has been stopped) is performed. In other words, the bias error correction value is changed.

Therefore, in a case where the procedure has proceeded to step S6 and step S7 via step S10 (i.e., the case where the vehicle is traveling), the bias error correction value is changed as a consequence. Thus, image correction based on the bias error correction is performed so as to correspond to this change. In other words, when the vehicle is traveling, image correction is performed in response to the change in the bias error correction value, and the display position of the image changes little by little with passage of time.

A processor (a display control device) 36 implements the first correction processing and the second correction processing described above by repeatedly performing the above steps.

As described above, when the vehicle is stopped, while the "bias error correction target value" is updated (calculated), the bias error correction value itself is not corrected (step S9). Therefore, at the time when the vehicle is stopped, image correction by the bias error correction is not performed.

Meanwhile, when the vehicle starts to travel, the processing of bringing, by a predetermined value (minute amount of change "ΔV"), the bias error correction value close to the "bias error correction target value" calculated when the vehicle has been stopped is performed (step S10). Therefore, in a case where the vehicle is traveling, image correction by the bias error correction is performed.

As described above, according to the second embodiment, it is possible not to perform the first correction processing which gradually changes the bias error correction value with passage of time during a stopped period of a vehicle but to perform the first correction processing during a traveling period of the vehicle (i.e., the second correction processing). As the first correction processing is performed only when the vehicle is traveling by avoiding the stopped period in which the occupant relatively has a leeway (and the vibration of the vehicle is also extremely small), the possibility that the occupant may perceive a change in the position of the image due to the correction of the bias error is further lowered. Therefore, it is possible to further suppress the possibility of causing a sense of incongruity to the occupant.

Figure 6:
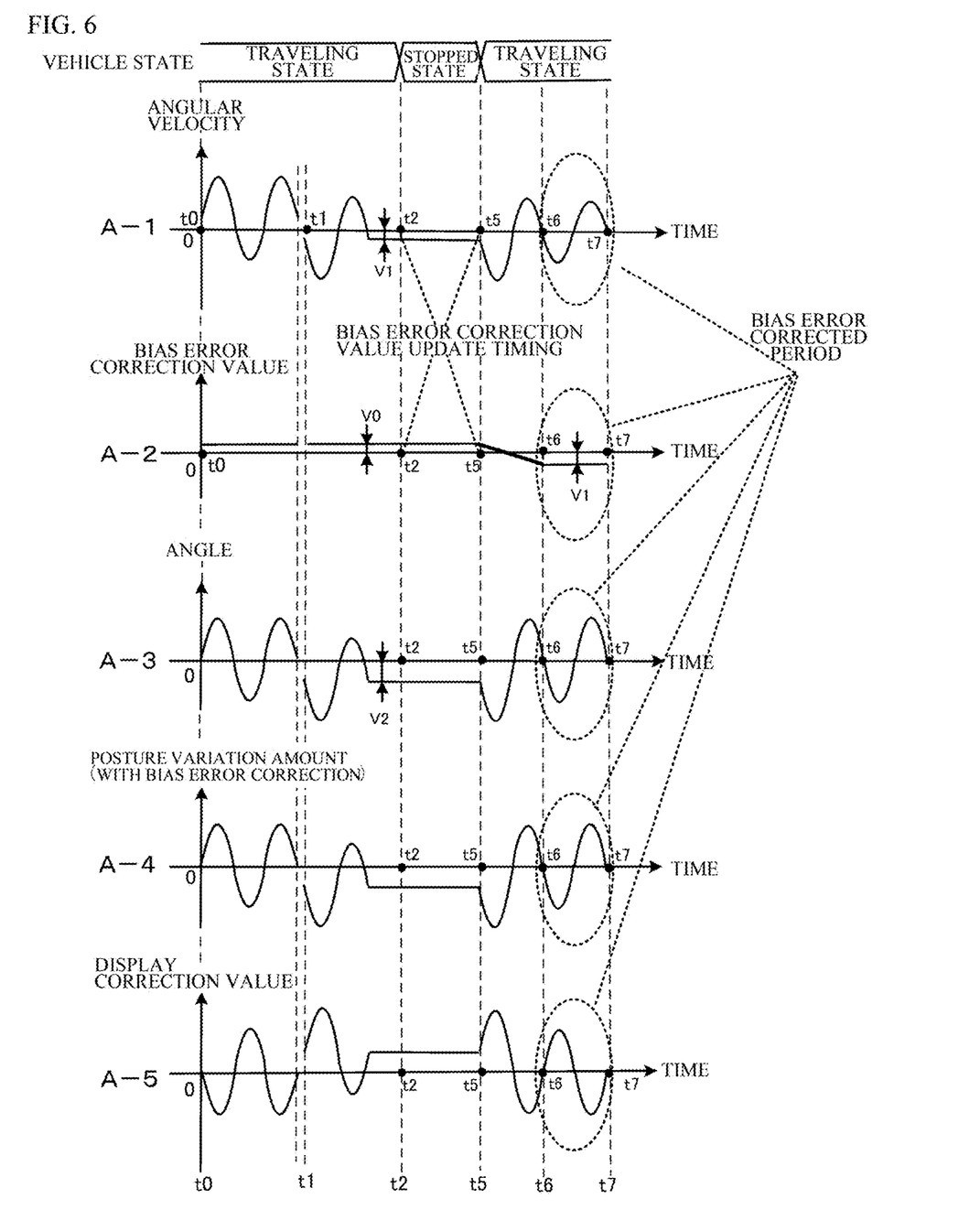
FIG. 6 is a waveform chart illustrating a main operation of the display control device according to the second embodiment.

Next, reference is made to FIG. 6. FIG. 6 is a waveform chart illustrating a main operation of the display control device according to the second embodiment.

In FIG. 6, the vehicle is in a traveling state during a period from time to to time t2, is in a stopped state from time t2 to time t5, and is in a traveling state during a period from time t5 to time t7.

In A-1 of FIG. 6, in a stopped period of the vehicle, the bias error correction value update timing arrives twice (time t2 and time t5). As described above, while the "bias error correction target value" is calculated (updated) at each timing, the "bias error correction value" itself is not corrected. Thus, at the time when the vehicle is stopped, image correction by the bias error correction is not performed.

In A-2 of FIG. 6, correction processing based on the bias error correction value is performed within a traveling period of the vehicle (a period from time t5 to time t6).

Specifically, at time t5 at which the vehicle starts to travel, the processing of bringing, by a predetermined value (minute amount of change ΔV), the bias error correction value close to the "bias error correction target value" calculated when the vehicle has been stopped (i.e., in A-2 of FIG. 6, arithmetic operation processing of the bias error correction value−ΔV) is performed.

Thereafter, the same processing (i.e., the arithmetic operation processing of subtracting ΔV) is repeatedly performed every (1/60) seconds. As a result, the previous bias error correction value V0 is gradually shifted to the updated bias error correction value V1 during a period from time t5 to time t6.

At time t6, the update of the bias error correction value is completed. At time t6 and thereafter (in FIG. 6, a period from time t6 to time t7), correction of the angular velocity is performed by using the bias error correction value V1 for which the shift has been completed.

In A-1 of FIG. 6, at a portion where a dashed ellipse is drawn (i.e., the period from time t6 to time t7), an accurate bias correction using the bias error correction value V1 for which the shift has been completed is performed. As a result, the waveform of the angular velocity becomes an accurate waveform that is vertically symmetrical.

In the drawing, the portion with the dashed ellipse is described as "bias error corrected period". Further, during the period from time t5 to time t6, the bias error correction value is gradually changed with passage of time, and this period can be referred to as a "bias error correction value shifting period".

Also in each of A-2 to A-5 of FIG. 6, the period from time t6 to time t7 corresponds to the "bias error corrected period".

Third Embodiment

Figure 7:
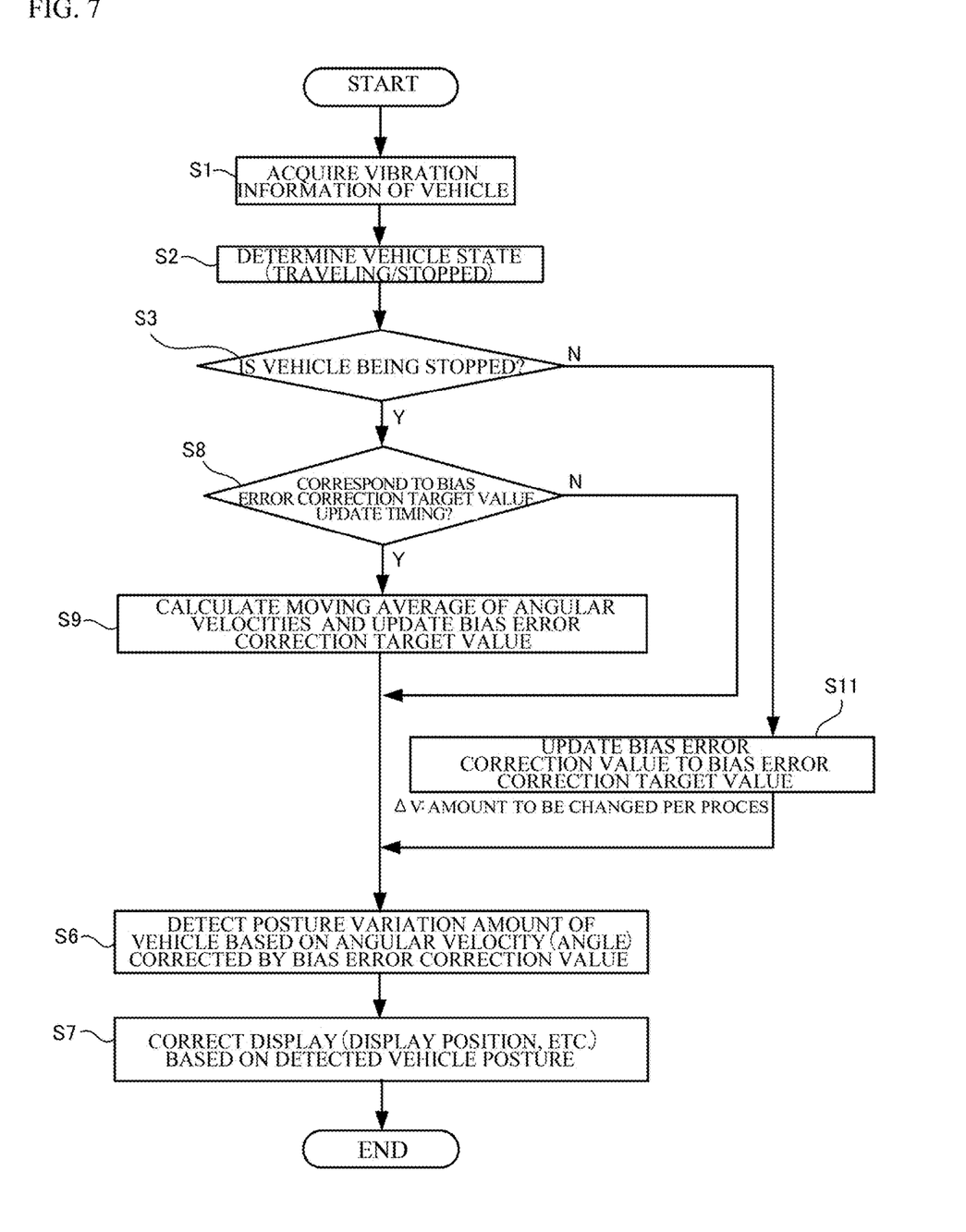
FIG. 7 is a flowchart illustrating a main operation procedure of a display control device according to a third embodiment.

Reference is made to FIG. 7. FIG. 7 is a flowchart illustrating a main operation procedure of a display control device according to a third embodiment.

In the third embodiment, the second correction processing described above (i.e., the correction processing of performing the bias error correction only during a traveling period of the vehicle) is performed. However, unlike the second embodiment, the first correction processing (i.e., the correction processing of gradually shifting the bias error correction value with passage of time) is not performed.

In addition, in performing the second correction processing, the operation of waiting for the vehicle to shift to a traveling state while updating, during a stopped period of the vehicle, a bias error correction value target value each time an update timing of the bias error correction value target value arrives is performed. Then, when the vehicle is in the traveling state, the previous bias error correction value is shifted to the latest bias error correction value that is updated when the vehicle has been stopped. In this way, bias error correction is performed. Thus, an accurate bias error correction can be performed on the basis of the latest bias error correction value.

Moreover, as the second correction processing is performed only when the vehicle is traveling by avoiding a stopped period in which the occupant relatively has a leeway (and the vibration of the vehicle is also extremely small), the possibility that the occupant may perceive a change in the position of an image due to the correction of the bias error is lowered. Therefore, it is possible to suppress the possibility of causing a sense of incongruity to the occupant.

FIG. 7 is mostly the same as FIG. 5 described above. Description of the steps in common with those of FIG. 5 will be omitted. However, in FIG. 7, step S10 of FIG. 5 is replaced with step S11, and FIG. 7 is different in this point.

In step S11 of FIG. 7, correction processing of updating the previous bias error correction value to the acquired bias error correction value is performed in a period in which the vehicle is in the traveling state. However, the correction processing (the first correction processing) of gradually shifting the bias error correction value with passage of time is not performed as in step S10 of FIG. 5.

Figure 8:
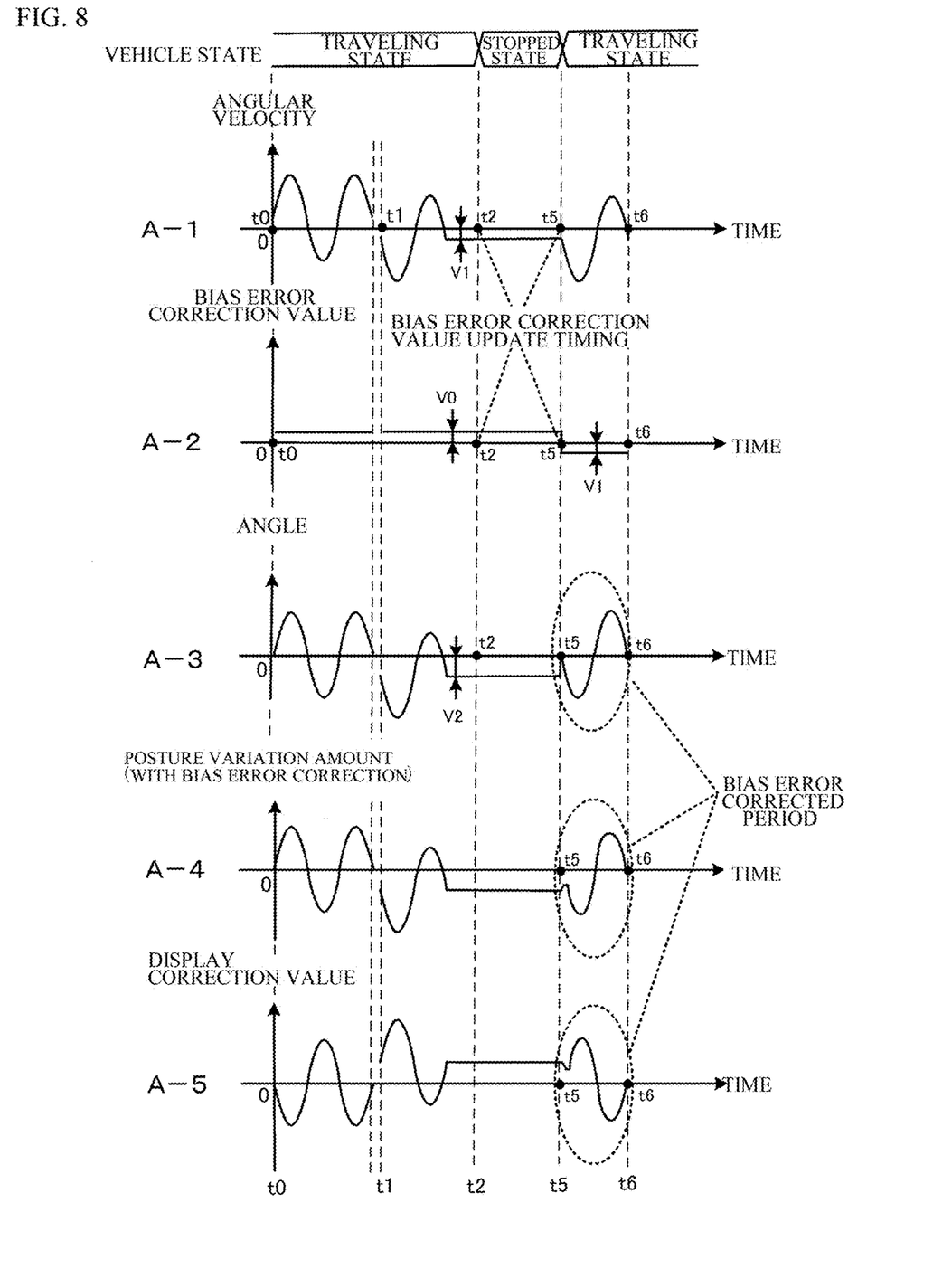
FIG. 8 is a waveform chart illustrating a main operation of the display control device according to the third embodiment.

Reference is made to FIG. 8. FIG. 8 is a waveform chart illustrating a main operation of the display control device according to the third embodiment.

In A-1 of FIG. 8, when the vehicle is being stopped, two bias error correction value updating times arrive (at time t2 and time t5). At each of these timings, a bias error correction value is acquired (updated) as needed. Note that time t5 is an end point of a period during which the vehicle is stopped, and is also a travel start point at which the vehicle starts to travel.

As described above, time t5 is also the travel start point of the vehicle. Therefore, in A-2 of FIG. 8, the previous bias error correction value V0 is immediately shifted to the latest bias error correction value V1 at time t5 (in other words, the bias error correction value is immediately switched).

In the waveform of angle information in A-3 of FIG. 8, a bias error V2 is immediately corrected at time t5, and a vibration waveform that is substantially vertically symmetrical is obtained in a period from time t5 to time t6. In the drawing, a period indicated by a dashed ellipse corresponds to a bias error corrected period.

Also in A-4 and A-5 of FIG. 8, although a slight disturbance in the waveform occurs immediately after time t5, a vibration waveform in which the bias error is substantially corrected is obtained in periods from time t5 to time t6.

Also in A-4 and A-5 of FIG. 8, the period indicated by the dashed ellipse corresponds to the bias error corrected period.

As described above, according to the present invention, it is possible to realize a display control device, a display device, and a display control method capable of correcting the bias error included in the vibration information of the vehicle as appropriate without causing a sense of incongruity to the occupant of the vehicle.

The display device is broadly interpreted, and may also be applied to, for example, a head-up display (HUD) device and other display instrumental devices. As the display instrumental device, a liquid crystal display device, a micro LED device, and other various display devices can be used.

Further, in the present specification, the term "vehicle" may also be interpreted as a transportation means in a broad sense. In addition, terms related to navigation (for example, sign, etc.) are also to be broadly interpreted in consideration of the standpoint or the like of, for example, navigation information in a broad sense that is useful for vehicle operation. Further, it is assumed that the HUD device includes a device used as a simulator (e.g., a simulator of an aircraft, a simulator as a game device, etc.).

The present invention is not limited to the exemplary embodiments described above, and those skilled in the art may be able to readily modify the exemplary embodiments described above to the extent of being within the scope of the claims.

REFERENCE SIGNS LIST

1 Vehicle (host vehicle)
2 Windshield (projected member)
5 Occupant (driver or passenger)
6 Viewpoint (eyes)
9 Roll angular velocity sensor
11 Pitch angular velocity sensor
12 Gyroscope sensor (sensor)
13 Vehicle electronic control unit (ECU)
22 Display portion (flat panel display, etc.)
24 Light source portion
26 Plane mirror
28 Curved mirror (concave mirror, etc.)
30 Curved mirror rotation mechanism
31 Curved mirror rotation control portion
32 Input interface (input IF)
36 Processor (display control device)
40 Vehicle vibration (pitching, rolling, etc.) information acquisition portion
41 Vehicle state determination portion 42 Bias error correction value acquisition portion
43 Bias error correction portion
44 Vehicle posture variation amount detection portion
45 Display correction portion
50 Memory (storage device or storage portion)
52 Correction table
54 Pitching correction table
56 Rolling correction table
59 Correction arithmetic operation data
65 Rendering memory
80 Image processing portion
82 Bus
84 Image generation portion
86 Correction portion (image correction portion)
88 Output buffer
100 Head-up display device (HUD device)

The invention claimed is:

1. A display control device which controls image display of a display device that is mounted on a vehicle, and causes an occupant who is on board the vehicle to visually recognize an image, the display control device comprising:
a processor configured to perform the functions of:
a vehicle vibration information acquisition portion which acquires vibration information of the vehicle;
a vehicle state determination portion which determines whether the vehicle is traveling or being stopped;
a bias error correction value acquisition portion which acquires, during a stopped period of the vehicle, a bias error correction value for correcting a bias error included in the acquired vibration information;
a bias error correction portion which corrects the vibration information based on the acquired bias error correction value;
a vehicle posture variation amount detection portion which detects a variation amount of a posture of the vehicle based on the corrected vibration information; and
a display correction portion which changes at least one of a position and a size of the image such that the image corresponds to the detected variation amount of the posture of the vehicle, wherein
the bias error correction portion performs, when a latest bias error correction value acquired by the bias error correction value acquisition portion is assumed as an updated bias error correction value, and the bias error correction value before the update is performed is assumed as a previous bias error correction value, at least one of:
first correction processing which gradually changes the previous bias error correction value with passage of time, and shifts the previous bias error correction value to the updated bias error correction value through a period of the change; and
second correction processing which does not perform a shifting operation of shifting the previous bias error correction value to the updated bias error correction value in a stopped period of the vehicle but performs the shifting operation in a traveling period of the vehicle.

2. The display control device according to claim 1, wherein
the bias error correction value acquisition portion calculates a moving average of output values of a sensor, which detects the vibration information of the vehicle, each time an update timing of the bias error correction value arrives during the stopped period of the vehicle, and determines the bias error correction value based on a moving average value that has been calculated.

3. The display control device according to claim 1, wherein when the bias error correction portion performs the first correction processing,
the first correction processing is performed in a period including a vehicle stopped period in which the bias error correction value is acquired by the bias error correction value acquisition portion.

4. The display control device according to claim 1, wherein
the bias error correction portion uses the first correction processing and the second correction processing in combination, and by the combined use of the first correction processing and the second correction processing, the first correction processing is not performed in the stopped period of the vehicle but is performed in the traveling period of the vehicle.

5. The display control device according to claim 1, wherein when the bias error correction value acquisition portion performs the second correction processing, the bias error correction value acquisition portion:
waits for the vehicle to shift to a traveling state while acquiring the bias error correction value each time an update timing of the bias error correction value arrives during the stopped period of the vehicle; and
shifts, when the vehicle is in the traveling state, the previous bias error correction value to the latest updated bias error correction value.

6. The display control device according to claim 1, wherein
the vibration information of the vehicle is an angular velocity or acceleration information in at least one of pitching and rolling of the vehicle.

7. A display device comprising:
a display control device according to claim 1; and
a display portion in which display of an image is controlled by the display control device.

8. The display device according to claim 7, wherein
the display device further comprises an optical system which projects display light of an image displayed on the display portion onto a projected member that is provided on the vehicle, and the display device is a head-up display device having a function of causing the occupant to visually recognize a virtual image.

9. A display control method in a display device which is mounted on a vehicle, the display control method comprising:
acquiring, during a stopped period of the vehicle, a bias error correction value for correcting a bias error included in vibration information of the vehicle;
correcting the vibration information based on the bias error correction value;
detecting a variation amount of a posture of the vehicle based on the corrected vibration information; and
changing at least one of a position and a size of an image such that the image corresponds to the detected variation amount of the posture of the vehicle, wherein
when a latest bias error correction value acquired by the acquiring of the bias error correction value is assumed as an updated bias error correction value, and the bias error correction value before the update is performed is assumed as a previous bias error correction value,
the correcting of the vibration information includes performing at least one of:
first correction processing which gradually changes the previous bias error correction value with passage of time, and shifts the previous bias error correction value to the updated bias error correction value through a period of the change; and second correction processing which does not perform a shifting operation of shifting the previous bias error correction value to the updated bias error correction value in a stopped period of the vehicle but performs the shifting operation in a traveling period of the vehicle.

* * * * *